United States Patent
Noel

(10) Patent No.: US 10,584,815 B2
(45) Date of Patent: Mar. 10, 2020

(54) CLAMPING ARRANGEMENT WITH ELASTOMERIC RETAINING MEMBER

(71) Applicant: Cooper-Standard Automotive Inc., Novi, MI (US)

(72) Inventor: Craig Noel, Bainbridge Island, WA (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 439 days.

(21) Appl. No.: 15/369,002

(22) Filed: Dec. 5, 2016

(65) Prior Publication Data
US 2017/0284575 A1    Oct. 5, 2017

Related U.S. Application Data

(60) Provisional application No. 62/315,708, filed on Mar. 31, 2016.

(51) Int. Cl.
  *F16L 21/02*  (2006.01)
  *F16L 33/03*  (2006.01)
  *F16L 21/06*  (2006.01)

(52) U.S. Cl.
  CPC .......... *F16L 21/02* (2013.01); *F16L 21/06* (2013.01); *F16L 33/03* (2013.01)

(58) Field of Classification Search
  CPC ......... F16L 21/02; F16L 21/06; F16L 21/065; F16L 33/03
  USPC ................. 285/238, 242, 244, 252, 420
  See application file for complete search history.

(56) References Cited

U.S. PATENT DOCUMENTS

| | | | |
|---|---|---|---|
| 4,882,814 A | 11/1989 | Takahashi | |
| 5,675,871 A | 10/1997 | Webb et al. | |
| 6,012,745 A * | 1/2000 | Fuoss | 285/420 X |
| 6,526,642 B2 | 3/2003 | Sausner | |
| 6,773,037 B2 | 8/2004 | Spurgat | |
| 7,111,389 B2 | 9/2006 | Cooper et al. | |
| 8,523,243 B2 * | 9/2013 | Geese | F16L 21/065 285/252 |
| 2006/0175837 A1 * | 8/2006 | Ignaczak | F16L 21/065 285/420 |
| 2007/0052238 A1 * | 3/2007 | An | F16L 21/065 285/420 |

FOREIGN PATENT DOCUMENTS

| | | |
|---|---|---|
| EP | 2860437 A1 | 4/2015 |
| FR | 2769068 A1 | 4/1999 |

OTHER PUBLICATIONS

Extended European Search Report for EP 17162657.5, EPO/ Munich, dated Aug. 1, 2017.

* cited by examiner

*Primary Examiner* — Zachary T Dragicevich
(74) *Attorney, Agent, or Firm* — Stephen T. Olson; Harness, Dickey & Pierce, P.L.C.

(57) ABSTRACT

A clamping arrangement includes a clamp member and an elastomeric member. The clamp member is operative in a first orientation having a first inner diameter and a second orientation having a second inner diameter. The first diameter is greater than the second diameter. The elastomeric retaining member is carried by the clamp member and is operative to temporarily retain the clamping arrangement to a first tubular member having an outer diameter less than the first inner diameter when the clamp member is in the first orientation.

17 Claims, 2 Drawing Sheets

CLAMPING ARRANGEMENT WITH ELASTOMERIC RETAINING MEMBER

CROSS-REFERENCE TO RELATED APPLICATION

This application claims priority to U.S. Provisional Patent Application No. 62/315,708 filed 31 Mar. 2016, which application is herein expressly incorporated by reference.

FIELD

The present teachings generally relate to a clamping arrangement for securing first and second tubular members relative to one another. More particularly, the present teachings relate to a clamping arrangement including an elastomeric retaining member for temporarily attaching a clamp member to a first tubular member prior to clamping of the first tubular member to a second tubular member. The present teachings also particularly relate to a method of temporarily attaching a clamp member to a tubular member with an elastomeric retaining member.

BACKGROUND

This section provides background information related to the present disclosure which is not necessarily prior art.

In various fluid handling applications, it is desirable to clamp first and second tubular members to one another. For example, motor vehicles require such clamping arrangements for the transmission of fuel, oil, coolant and other fluids. To facilitate assembly, clamps may be secured to one of the tubular members temporarily with an adhesive, for example.

While known clamping arrangements for securing first and second tubular members have generally proven to be acceptable for their intended uses, there is a continuous need for improvement in the art.

SUMMARY

This section provides a general summary of the disclosure, and is not a comprehensive disclosure of its full scope or all of its features.

In accordance with one particular aspect, the present teachings provide a clamping arrangement for clamping a first tubular member to a second tubular member. The clamping arrangement includes a clamp member and an elastomeric member. The clamp member is operative in a first orientation having a first inner diameter and a second orientation having a second inner diameter. The first diameter is greater than the second diameter. The elastomeric retaining member is carried by the clamp member and is operative to temporarily retain the clamping arrangement to a hose having an outer diameter less than the first inner diameter when the clamp member is in the first orientation.

In accordance with another particular aspect, the present teachings provide a clamping arrangement for securing first and second tubular members. The clamping arrangement includes a clamp member and an elastomeric band. The clamp member is operative in a pre-clamping orientation prior to clamping of the first and second tubular members and a clamping orientation when clamping the first and second tubular members. The elastomeric band is carried by the clamp member and operative to temporarily retain the clamping arrangement to the first tubular member when the clamp member is in the pre-clamping orientation. The elastomeric band is concentrically oriented relative to the clamp member.

In accordance with yet another particular aspect, the present teachings provide a method of clamping inner and outer tubular members. The method includes providing a clamping assembly having a clamping member and an elastomeric retaining member carried by the clamping member. The clamping member is operative in a first orientation having a first inner diameter and a second orientation having a second inner diameter, the first inner diameter being greater than the second inner diameter. The method additionally includes elastically expanding the elastomeric retaining member to a retaining diameter substantially equal to an outer diameter of the outer tubular member with the elastomeric retaining member concentrically positioned between the outer tube and the clamping member. The elastomeric retaining member temporarily retains the clamping assembly to the outer tubular member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF VARIOUS ASPECTS

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

Figure 1:
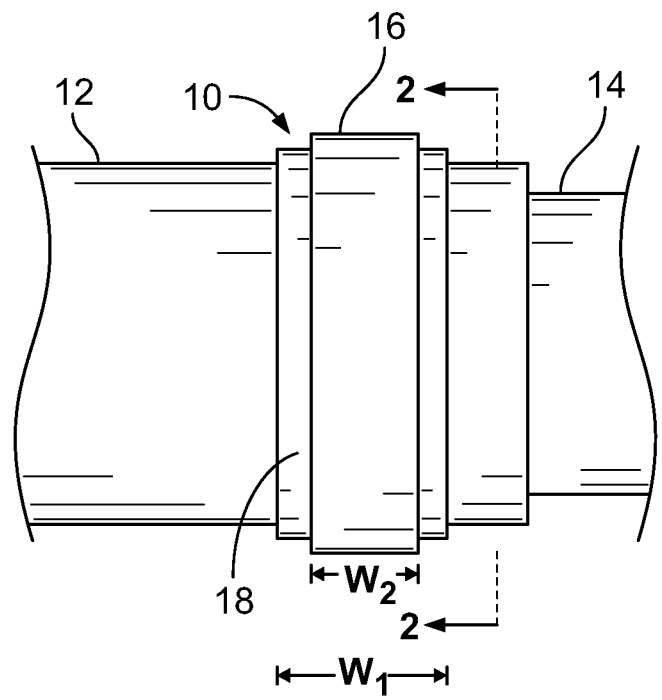
FIG. 1 is a side view of a clamping arrangement constructed in accordance with the present teachings, the clamping arrangement shown operatively clamping a first tubular member to a second tubular member.
Figure 2:
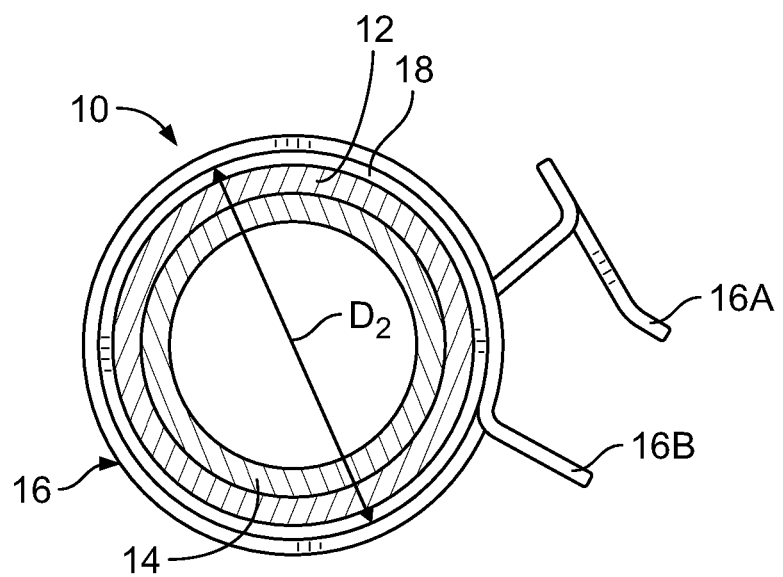
FIG. 2 is a cross-sectional view taken along the line 2-2 of FIG. 1, the clamp member shown in a clamping orientation.
Figure 3:
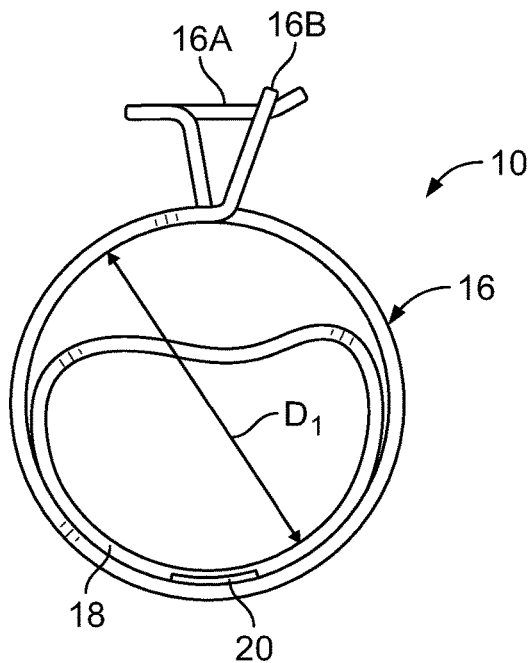
FIG. 3 is an end view of the clamping arrangement of FIGS. 1 and 2, the clamp member shown in an open or pre-clamping orientation prior to temporary attachment of the clamping arrangement to the first clamp member.

With reference to FIGS. 1 through 3 of the drawings, a clamping arrangement in accordance with the present teachings is illustrated and identified at reference character 10. As particularly shown in FIGS. 1 and 2, the clamping arrangement 10 may be particularly adapted for clamping a first or outer tubular member 12 and a second or inner tubular member 14. The first tubular member may be a rubber hose 12, for example. The second tubular member may be a metal tube 14, for example, such as used in automotive applications for the transmission of fluid such as fuel, oil, coolant and the like. It will be readily appreciated, however, that the present teachings are not limited to any particular application or particular materials for the tubular members 12 and 14.

The clamping arrangement 10 is shown to generally include a clamp member 16 and an elastomeric retaining member 18. Insofar as the present teachings are concerned, the clamp member 16 shown in the drawings will be understood to be conventional in construction and operation to the extent not otherwise described herein. The particular clamp member 14 illustrated will be understood to be commonly known as a spring band clamp and will be understood to be exemplary in nature. Other clamp members may be alternatively incorporated within the scope of the present teachings.

The clamp member 16 is operative in a first or pre-clamping orientation and a second or clamping orientation. The pre-clamping orientation is shown in FIG. 3, for example. The clamping orientation is shown in FIG. 2, for example. In the first orientation, the clamp member 16 has a first diameter $D_1$. In the second orientation, the clamp member 16 has a second diameter $D_2$. The first diameter $D_1$ is greater than the second diameter $D_2$. In a conventional manner, the clamp member 16 may be constructed of metal and inherently biased to the second, reduced diameter orientation. Further in a conventional manner, first and second ends 16A and 16B of the clamp member 16 may cooperate to selectively maintain the clamp member 16 in the first orientation against its inherent bias.

The elastomeric retaining member 18 may be a band constructed of an elastic material such as rubber. In the embodiment illustrated, the elastomeric retaining member 18 may define a closed shape. A perimeter of the elastomeric retaining member 18 has a length. The length of the elastomeric retaining member 18 is smaller than an outer circumference of the outer tubular member 12 when the elastomeric retaining member 18 is not under any external forces (e.g., when it is not stretched). Explaining further, when the elastomeric retaining member 18 is not stretched but generally oriented in a circle, the elastomeric retaining member 18 may have a diameter smaller than the outer diameter of the outer tubular member 12. The elastomeric retaining member 18 may be elastically deformed to have a diameter greater than the outer tubular member 12.

The elastomeric retaining member 18 is carried by the clamp member 16. In this regard, the elastomeric retaining member 18 may be adhesively or otherwise suitably secured to the clamp member 16 at one or more points of attachment 20. In FIG. 3, a single adhesive point of attachment 20 may be used between the elastomeric retaining member 18 and the clamp member 16. The point of attachment 20 may be at a bottom of the clamp member 16. The elastomeric retaining member 18 may be secured to the clamp member 16 at any point around the inner circumference of the clamp member, however. Also, there may be multiple points of attachment. Alternatively, the elastomeric retaining member 18 may be molded to include a retaining feature to facilitate attachment to the clamp member 16, for example. Within the scope of the present teachings, it is sufficient that the elastomeric retaining member 18 be carried by the clamp member 16, adhesively or otherwise.

As shown in FIG. 1, the elastomeric retaining member 18 may have a first width $W_1$ and the clamp member 16 may have a second width $W_2$. The first width $W_1$ may be greater than the second width $W_2$. In certain embodiments, the elastomeric retaining member 18 may have a thickness of approximately 1.0 mm. As shown in FIG. 1, the elastomeric retaining member 18 may axially extend in both directions beyond the clamp member 16.

The clamping arrangement may be temporarily secured to the outer tubular member 12 by elastically expanding the elastomeric retaining member 18 from the unexpanded state of FIG. 3 and positioning the clamping arrangement 10 such that the elastomeric retaining member 18 is concentrically positioned between the outer tubular member 12 and the clamp member 16. In this position, an inherent bias of the elastomeric retaining member 18 may be used to temporarily secure the clamping arrangement 10 to the outer tubular member 12 while the clamp member 16 is in the pre-clamping orientation. In this manner, the clamping arrangement 10 may be carried by the outer tubular member 12 prior to introduction of the inner tubular member 14 into the outer tubular member 12 and more secure clamping between the outer tubular member 12 and the inner tubular member 14.

Figure 4:
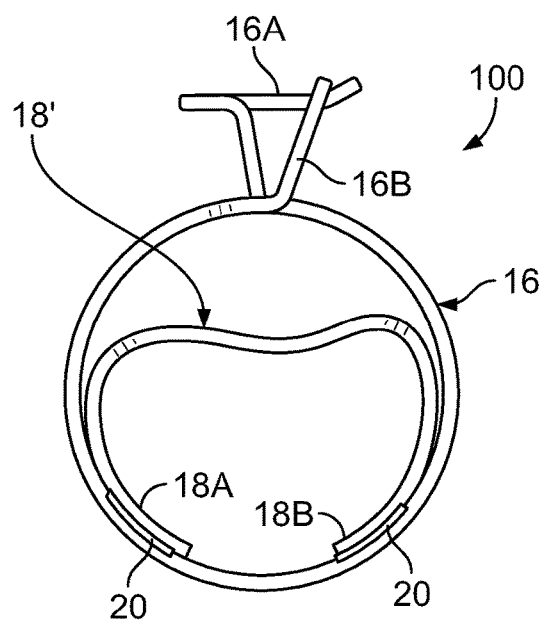
FIG. 4 is a side view similar to FIG. 3, illustrating another clamping arrangement in accordance with the present teachings.
Figure 5:
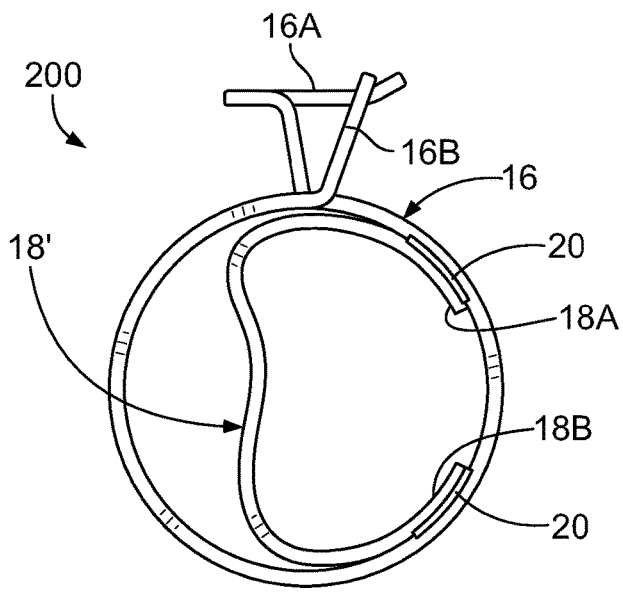
FIG. 5 is a side view similar to FIG. 3, illustrating another clamping arrangement in accordance with the present teachings.

Turning to FIGS. 4 and 5, further clamping arrangements constructed in accordance with the present teachings are shown and identified at reference characters 100 and 200, respectively. To the extent not otherwise described, the clamping arrangements 100 and 200 will be understood to be similar to clamping arrangement 10. Thus, similar reference characters will be used to identify similar elements. The clamping arrangements 100 and 200 differ principally from the clamping arrangement 10 by incorporating an alternative elastomeric retaining member 18'.

In the embodiments of FIGS. 4 and 5, the elastomeric retaining member 18' is illustrated to define an open shape including a first end 18A and a second end 18B. The first and second ends 18A and 18B may be secured to the clamp member 16 at attachment points 20. As with the clamping arrangement 10, attachment of the elastomeric retaining member 18 to the clamp member 16 may be made with adhesive, molded in features of the elastomeric retaining member 18' or in any other manner known in the art. As illustrated in FIG. 4, the first and second ends 18A and 18B may be positioned on the clamp member 16 at approximately 7:00 and 5:00 (the ends 16A and 16B of the clamp member 16 being at 12:00). As illustrated in FIG. 5, the first and second ends 18A and 18B may be positioned on the clamp arrangement 16 at approximately 2:00 and 4:00. The location of the attachment points in FIGS. 4 and 5 will be understood to be exemplary. In this regard, it will be understood that the ends 18A and 18B may be positioned anywhere about the circumference of the clamp member 16 within the scope of the present teachings. It will also be understood that the elastomeric retaining member 18' may be secured to the clamp member 16 at additional points.

In use, the clamp member 16 begins in the first orientation with the longer diameter and the elastomeric retaining member 18 or 18' is unrestricted. The elastomeric retaining member 18 or 18' of the clamping assembly 10, 100 or 200 is elastically expanded to at least a retaining diameter substantially equal to an outer diameter of the outer tubular member 12. The clamping assembly 10, 100 or 200 is circumferentially positioned about the outer tubular member 12 and the inherent bias of the elastomeric retaining member 18 or 18', which is concentrically positioned between the outer tubular member 12 and the clamp member 16, temporarily retains the clamping assembly 10, 100 or 200 to the outer tubular member 12, while the clamp member 16 is maintained in the first orientation. With the clamping assembly 10, 100 or 200 carried on the outer tubular member 12, the inner tubular member 14 is inserted into the outer tubular member 12. The clamp member 16 is changed from the first orientation to the second orientation to secure the outer tubular member 12 to the inner tubular member 14. This may be done manually or with a tool (not shown).

It will now be appreciated that various embodiments of a clamping arrangement are provided for locating and retaining a pre-opened clamping member on a tubular member or hose for simplified assembly to a mating tubular member, hose end form or component. The elastomeric retaining member 18 or 18' will hold the pre-opened clamping member 16 in a specified distance from an end of the hose and in a specific orientation to allow optional tool access to release the clamping member 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clamping arrangement for clamping a hose to a tube, the clamping arrangement comprising:
   a clamp member operative in a first orientation having a first inner diameter and a second orientation having a second inner diameter, the first inner diameter being greater than the second inner diameter; and
   an elastomeric retaining member carried by the clamp member and operative to temporarily retain the clamping arrangement to the hose having an outer diameter less than the first inner diameter when the clamp member is in the first orientation,
   wherein the elastomeric retaining member is elastically expandable from an unexpanded state to a larger, expanded shape,
   wherein in the expanded shape, the elastomeric retaining member has an inherent bias to return to the unexpanded shape.

2. The clamping arrangement of claim 1, wherein the clamp member is metal.

3. The clamping arrangement of claim 1, wherein the elastomeric retaining member is concentrically positioned within the clamp member.

4. The clamping arrangement of claim 1, wherein the elastomeric retaining member has a closed shape.

5. The clamping arrangement of claim 1, wherein the elastomeric retaining member is adhesively secured to the clamp member.

6. The clamping arrangement of claim 1, wherein the elastomeric retaining member defines an open shape with first and second ends.

7. The clamping arrangement of claim 1, wherein the elastomeric retaining member has a perimeter smaller than a circumference of the hose when not subject to outside forces.

8. The clamping arrangement of claim 1, wherein the elastomeric retaining member is stretchable.

9. The clamping arrangement of claim 1, in combination with the hose, the elastomeric retaining member retaining the clamping arrangement to the hose when the clamp member is in the first orientation.

10. The clamping arrangement of claim 9, wherein the elastomeric retaining member has a first length when unstretched, a second, greater length when stretched.

11. A clamping arrangement in combination with first and second tubular members, the clamping arrangement comprising:
    a clamp member operative in a pre-clamping orientation prior to clamping of the first and second tubular members and a clamping orientation when clamping the first and second tubular members; and
    a stretchable elastomeric band carried by the clamp member, the stretchable elastomeric band having an inherent bias toward an unstretched condition that retains the clamping arrangement to the first tubular member when the clamp member is in the pre-clamping orientation, the elastomeric band concentrically oriented relative to the clamp member,
    wherein the elastomeric band has a first length when unstretched and a second greater length when stretched.

12. The clamping arrangement of claim 11, wherein the clamp member is metal.

13. The clamping arrangement of claim 11, wherein the elastomeric band is concentrically positioned within the clamp member.

14. The clamping arrangement of claim 11, wherein the elastomeric band has a closed shape.

15. The clamping arrangement of claim 11, wherein the elastomeric band has first and second ends.

16. The clamping arrangement of claim 11, wherein the elastomeric band has a perimeter smaller than a circumference of the first tubular member when not subject to outside forces.

17. The clamping arrangement of claim 11, wherein the elastomeric band is adhesively secured to the clamp member.

* * * * *